United States Patent Office 3,654,102
Patented Apr. 4, 1972

3,654,102
METHOD OF PREPARING ELECTROLYTIC MANGANESE DIOXIDE
Thomas W. Clapper, Oklahoma City, Okla., and Martin A. Prieto, Whittier, Calif., assignors to American Potash & Chemical Corporation, Oklahoma City, Okla.
No Drawing. Filed Aug. 25, 1970, Ser. No. 66,871
Int. Cl. C23b 11/00; B01k 3/06
U.S. Cl. 204—83                    5 Claims

ABSTRACT OF THE DISCLOSURE

Method of preparing manganese dioxide by the electrolysis of an aqueous solution containing sulfuric acid and manganese sulfate wherein the improvement comprises the use of an anode formed of an expanded metal of titanium, tantalum or zirconium.

BACKGROUND OF THE INVENTION

This invention relates to a method for preparing electrolytic manganese dioxide. More particularly, it relates to a more efficient method of preparing electrolytic manganese dioxide utilizing an anode formed of an expanded metal selected from the group consisting of titanium, tantalum and zirconium.

It is well known that manganese dioxide of battery grade quality is currently produced commercially by an electrolytic process. That process involves the electrolysis of an aqueous solution of from about 50–100 gm./liter of manganese sulfate and 5–75 gm./liter of sulfuric acid. The manganese dioxide is deposited in a massive form usually about one inch thick on an anode of graphite or lead alloy.

If plate graphite or lead is used for the anode, the manganese dioxide is stripped from the plate by hitting it with a hammer. If a graphite rod anode is used, it is generally ground with the manganese dioxide.

More recently, titanium in rod or plate form have been used as the anode material. Titanium as an anode material has a distinct advantage over graphite or lead for the production of manganese dioxide. Thus, unlike titanium, both graphite and lead alloys break down during the electrolysis process and require periodic replacement, thereby adding to the cost of production.

Moreover, manganese dioxide produced with graphite or lead alloy anodes is invariably contaminated with decomposition products of graphite or lead, thereby affecting its quality.

The use of an anode of titanium substantially overcomes those problems. However, it does introduce new difficulties. The surface of such an anode tends to become oxidized or passivated during electrolysis. The oxide film has a high electrical resistance such that the cell voltage increases with time during electrolysis. Further, during the initial stages of operation of the cell the manganese dioxide deposit has a tendency to peel away or spall off the titanium metal substrate. This creates problems in recovering the $MnO_2$ and thereby adversely affects the economics of the process as well as the quality of the product.

Numerous investigators have undertaken to utilize titanium for the anode with some measure of success. For example, U.S. 2,608,531 discloses a porous or sponge-like titanium anode. U.S. 3,436,323 discloses a titanium anode that is sand blasted to give it a finely aventurine surface. These anodes while capable of producing manganese dioxide plate have certain inherent problems, such as for example, weakness in mechanical characteristics, expense of fabrication, necessity of rigid control of the surface condition or the like.

DESCRIPTION OF THE INVENTION

It has now been discovered that an anode of expanded metal selected from the group consisting of titanium, tantalum and zirconium will resolve the problem of peeling or spalling of the manganese dioxide deposit. Surprisingly, the use of the expanded metal anode permits operation under a wider variance of conditions and at higher current densities than sand blasted anodes, without peeling of the deposit or passivation of the electrode.

It is now possible to obtain thicker deposits of manganese dioxide than was heretofore possible with the anodes of the prior art. Moreover, for reasons not fully understood, the expanded metal anode is less subject to passivation than the prior art anodes. Thus, using the anode of the present invention it now is feasible to operate at higher current densities and acid concentrations.

The term "expanded metal" as used herein refers to sheet metal which has been slit and expanded by stretching perpendicularly to the slits to provide an open mesh network of interconnected strands which enclose openings of diamond, oval or other shapes. The webs are generally flat in cross-section.

The expanded metal may be used in a variety of gauges or thicknesses from 0.02 inch to 0.20 inch. Sheets of expanded metal having a strand width of from about 0.09 to 0.75 inch and an expansion ratio of from about 10 to 50 percent have been found satisfactory for the anode.

Particularly good results have been obtained with an expansion ratio of from about 30 to 40 percent, a strand width of from about 0.25 inch to 0.50 inch and a thickness of from about .04 to .08 inch.

Titanium is the preferred metal since it is commercially available in a wide range of mesh sizes and configurations.

The electrolytes applicable to the present invention are those containing a source of manganese ions in an amount of from about 20 to 80 gm./liter and sulfuric acid in an amount of from 10 to 50 gm./liter. The preferred concentrations are from about 30 to 50 gm./liter of $Mn^{++}$ and from about 15–25 gm./liter of $H_2SO_4$.

The temperature of the electrolyte should be maintained at a temperature of from 90° C. to 100° C. The current density should be maintained within the range of from 5 to 15 a.s.f. Particularly good results have been obtained with the current density in the range of from about 8 to 10 a.s.f., and the temperature of the electrolyte in the range of from about 95° C. to 98° C.

The following examples are set forth to more fully demonstrate the present invention.

EXAMPLE I

To determine the susceptibility of an expanded metal anode to passivation or polarization, the following tests were conducted.

Five electrolysis tests were made with an expanded metal anode of titanium. The expanded metal was .040 inch gauge by .090 inch strand width. The actual metal surface area of the anode was approximately 51% of its projected area. The metal was washed and treated with HCl to remove any oxide prior to its installation in a cell.

The initial test was made at conditions for a good deposit with a titanium sheet anode. Electrolysis was initiated at 40 gm./liter manganese concentration and essentially zero acid concentration. The amount of current passing through the anode represented a projected area current density of 7.8 a.s.f. However, the actual metal area current density was about 15.2 a.s.f. At the completion of the run, the deposit was examined and found to be dense, black-grey in appearance and relatively tightly bound to the anode. The deposit had grown between the one half-inch mesh holes to completely cover the anode.

For the second test, this same anode was stripped of the manganese dioxide deposit and reinserted in the electrolyte cell without cleaning. The second test was initiated with an initial manganese concentration of 40–45 gm./liter and 19.4 gm./liter of $H_2SO_4$.

Test number three is a repitition of test number two, but with an unused expanded metal anode.

Test number four utilized the same procedure and parameters except the acid content of the electrolyte was raised to 30 gm./liter of $H_2SO_4$.

The results of these tests, as shown in the table below, indicate that when using expanded titanium metal as an anode there was no polarization with a variation in acid concentration.

TABLE I

| | | | Electrolysis conditions | | | | | | |
|---|---|---|---|---|---|---|---|---|---|
| Test | Temp., °C. | Mn avg., gm./l. | $H_2SO_4$, gm./l. | | Cell volts | | | Current density | Time hours |
| | | | Initial | Avg. | Initial | Final | Avg. | | |
| 1 | 95 | 47.4 | | 17.5 | 3.8 | 2.2 | 2.2 | 7.8 | 360 |
| 2 | 95 | 51.2 | 19.4 | 23.9 | 2.44 | 2.19 | 2.21 | 7.8 | 168 |
| 3 | 95 | 48.1 | 19.4 | 25.4 | 2.14 | 2.14 | 2.25 | 7.8 | 168 |
| 4 | 95 | 44.8 | 31.7 | 30.3 | 2.25 | 2.61 | 2.52 | 7.8 | 360 |

EXAMPLE II

Five electrolyses tests were run to determine the effect of electrolysis variables on deposit characteristics, polarization of the anode and product quality. The acid content and cell voltage were checked at two hour intervals.

The anode was the same type as described in Example I and the electrolyte was maintained at 95° C. The projected current density on tests one and two was maintained at 7.8 a.s.f. The projected current density on tests three, four and five were maintained at 10 a.s.f.

TABLE II

| | | Electrolysis conditions | | | | | | |
|---|---|---|---|---|---|---|---|---|
| Test | Mn, gm./l. | $H_2SO_4$, gm./l. | | Cell volts | | | Time, hours, | Deposit Integrity, PF |
| | | Initial | Avg. | Initial | Final | Avg. | | |
| 1 | 51.9 | 40.6 | 44.4 | 2.7 | 12.0P | 4.07 | 168 | 3 |
| 2 | 46.6 | 38.4 | 41.4 | 2.45 | 3.75 | 3.03 | 312 | 3 |
| 3 | 41.6 | 20.9 | 21.9 | 2.50 | 9.30P | 3.34 | 216 | 3 |
| 4 | 40.7 | 30.2 | 29.2 | 3.30 | 10.2P | 5.4 | 142 | 2 |
| 5 | 44.3 | 9.9 | 13.7 | 2.40 | 2.58 | 2.60 | 336 | 3 |

NOTE.—P=Polarized i.e. cell voltage >5; PF=Peeling factor: 1-Peeled or flaked 2-Cracked or split; 3-Good.

Two of the tests, 1 and 2, were conducted at relatively high sulfuric acid concentration (approximately 40 to 45 g./l. $H_2SO_4$). Polarization of the anode occurred after 168 hours of electrolysis during test 1, whereas test 2 was operated for 312 hours with a 1.3 volt rise in cell voltage. A closer inspection of the acid concentrations indicated that polarization of test 1 occurred when the acid concentration rose to about 49 g./l. $H_2SO_4$. Hence, it appears that at about 8 a.s.f. and at 45–50 g./l. Mn. with expanded metal anodes the critical acid concentration is approximately 45–50 g./l. $H_2SO_4$.

Three tests, 3, 4, and 5, made at a current density of 10 a.s.f. at 40–45 g./l. Mn with three different acid concentrations indicate that the critical $H_2SO_4$ concentration for expanded titanium electrodes to the onset of polarization is in the range of about 20 g./l. when the current density is 10 a.s.f.

What is claimed is:

1. In the method of preparing manganese dioxide by the electrolyses of an aqueous solution containing sulfuric acid and manganese sulfate wherein the improvement comprises using as an anode expanded metal selected from the group consisting of titanium, tantalum and zirconium.

2. The method of claim 1 wherein the expanded metal has a strand width of from about 0.09 to .75 inch, a thickness of from about .02 to 0.20 inch and an expansion ratio of from about 10 to 50 percent.

3. The method of claim 1 wherein the sulfuric acid is present in an amount of from 10 gm./liter to 50 gm./liter, the solution is maintained at a temperature of from about 90–100° C., and the manganese sulfate is present in an amount of from about 20 gm./liter to 80 gm./liter.

4. The method of claim 1 wherein the current density is less than 15 a.s.f.

5. The method of claim 2 wherein the expanded metal is titanium, the expansion ratio is from about 30 to 40%, the sulfuric acid is present in an amount of from about 15 to 25 gm./liter, the solution is maintained at a temperature of from about 95° C. to 98° C. and the current density is less than 10 a.s.f.

References Cited

UNITED STATES PATENTS

| 2,608,531 | 8/1952 | Fox | 204—83 |
| 3,436,323 | 4/1969 | Shimizu et al. | 204—292 X |
| 3,438,878 | 4/1969 | Bell et al. | 204—83 |

FOREIGN PATENTS

| 1,198,332 | 8/1965 | Germany | 204—284 |

J. C. EDMUNDSON, Primary Examiner

U.S. Cl. X.R.

204—284

UNITED STATES PATENT OFFICE
CERTIFICATE OF CORRECTION

Patent No. __3,654,102__ Dated __April 4, 1972__

Inventor(s) __Thomas W. Clapper and Martin A. Prieto__

It is certified that error appears in the above-identified patent and that said Letters Patent are hereby corrected as shown below:

Column 3, line 20, in the table, the sub-headings under heading "Cell Volts" should read -- Initial, Final and Average -- line 33, "intervale" should read -- intervals --

Signed and sealed this 22nd day of August 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,654,102    Dated April 4, 1972

Inventor(s) Thomas W. Clapper et al

It is certified that error appears in the above-identified patent and that said Letters Patent are hereby corrected as shown below:

In the heading to the printing specification, "American Potash & Chemical Corporation, Oklahoma City, Okla." should read -- Kerr-McGee Chemical Corp., Oklahoma City, Okla., a corporation of Delaware --.

Column 3, line 20, in the table, the sub-headings under heading Cell Volts should appear -- Initial, Final and Average --; line 33, "intervale" should appear -- intervals --.

Signed and sealed this 19th day of December 1972.

(SEAL)
Attest:

EDWARD M. FLETCHER, JR.
Attesting Officer

ROBERT GOTTSCHALK
Commissioner of Patents